(12) United States Patent
Vankamamidi et al.

(10) Patent No.: US 11,630,584 B2
(45) Date of Patent: Apr. 18, 2023

(54) STORAGE MANAGEMENT SYSTEM AND METHOD

(71) Applicant: EMC IP Holding Company, LLC, Hopkinton, MA (US)

(72) Inventors: Vamsi K. Vankamamidi, Newton, MA (US); Philippe Armangau, Acton, MA (US); Bruce E. Caram, Hudson, MA (US); Ajay Karri, South Grafton, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 143 days.

(21) Appl. No.: 16/674,555

(22) Filed: Nov. 5, 2019

(65) Prior Publication Data

US 2021/0133156 A1   May 6, 2021

(51) Int. Cl.
*G06F 3/06* (2006.01)
*G06F 16/18* (2019.01)
*G06F 16/14* (2019.01)
*G06F 16/16* (2019.01)
*G06F 16/332* (2019.01)

(52) U.S. Cl.
CPC ............ *G06F 3/0617* (2013.01); *G06F 3/067* (2013.01); *G06F 3/0628* (2013.01); *G06F 3/0689* (2013.01); *G06F 16/144* (2019.01); *G06F 16/148* (2019.01); *G06F 16/156* (2019.01); *G06F 16/168* (2019.01); *G06F 16/1847* (2019.01); *G06F 16/3325* (2019.01)

(58) Field of Classification Search
CPC ...... G06F 3/0617; G06F 3/0628; G06F 3/067; G06F 3/0689; G06F 16/144; G06F 16/148; G06F 16/156; G06F 16/168; G06F 16/1847; G06F 16/3325; G06F 3/0604; G06F 3/0659
See application file for complete search history.

(56) References Cited

U.S. PATENT DOCUMENTS

| | | | |
|---|---|---|---|
| 8,260,769 B1 * | 9/2012 | Fuller | G06F 16/24539 707/721 |
| 2014/0012822 A1 * | 1/2014 | Aronovich | G06F 16/1752 707/692 |
| 2014/0046920 A1 * | 2/2014 | Shuma | G06F 16/00 707/812 |
| 2015/0091920 A1 * | 4/2015 | Rygh | G06T 1/60 345/522 |
| 2017/0017413 A1 * | 1/2017 | Aston | G06F 3/0659 |

* cited by examiner

*Primary Examiner* — Mark D Featherstone
*Assistant Examiner* — Samuel C Sharpless, III
(74) *Attorney, Agent, or Firm* — Brian J. Colandreo; Mark H. Whittenberger; Holland & Knight LLP

(57) ABSTRACT

A method, computer program product, and computing system for maintaining a first cursor pointer for a memory system, wherein the first cursor pointer concerns a first search criteria and identifies an initial first cursor starting location; receiving a first search request for the memory system that satisfies the first search criteria; executing the first search request within an initial first search window starting at the initial first cursor starting location; and updating the first cursor pointer to identify an updated first cursor starting location based, at least in part, upon the initial first search window.

18 Claims, 3 Drawing Sheets ically, various methodologies may be employed to protect and distribute such electronic content, wherein the storage systems that process such content may strive to do so in as an efficient manner as possible. Unfortunately and due to the complexity of such storage systems, simple processes (such as assigning memory portions for certain tasks) quickly become complex due to the quantity of memory available within these systems.

STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to the complexity of such storage systems, simple processes (such as assigning memory portions for certain tasks) quickly become complex due to the quantity of memory available within these systems.

SUMMARY OF DISCLOSURE

In one implementation, a computer-implemented method is executed on a computing device and includes: maintaining a first cursor pointer for a memory system, wherein the first cursor pointer concerns a first search criteria and identifies an initial first cursor starting location; receiving a first search request for the memory system that satisfies the first search criteria; executing the first search request within an initial first search window starting at the initial first cursor starting location; and updating the first cursor pointer to identify an updated first cursor starting location based, at least in part, upon the initial first search window One or more of the following features may be included. If the first search request was executed successfully, the first search request may be satisfied. If the first search request was not executed successfully, the first search request may be executed within an expanded first search window. The updated first cursor starting location may be revised based, at least in part, upon the expanded first search window. A new search request may be received for the memory system that satisfies the first search criteria. The new search request may be executed within a new first search window starting at the updated first cursor starting location. The first cursor pointer may be updated to identify a new first cursor starting location based, at least in part, upon the new first search window. A second cursor pointer may be maintained for the memory system, wherein the second cursor pointer may concern a second search criteria and may identifies an initial second cursor starting location. A second search request may be received for the memory system that satisfies the second search criteria. The second search request may be executed within an initial second search window starting at the initial second cursor starting location. The second cursor pointer may be updated to identify an updated second cursor starting location based, at least in part, upon the initial second search window. The memory system may be a portion of a storage platform.

In another implementation, a computer program product resides on a computer readable medium and has a plurality of instructions stored on it. When executed by a processor, the instructions cause the processor to perform operations including: maintaining a first cursor pointer for a memory system, wherein the first cursor pointer concerns a first search criteria and identifies an initial first cursor starting location; receiving a first search request for the memory system that satisfies the first search criteria; executing the first search request within an initial first search window starting at the initial first cursor starting location; and updating the first cursor pointer to identify an updated first cursor starting location based, at least in part, upon the initial first search window.

One or more of the following features may be included. If the first search request was executed successfully, the first search request may be satisfied. If the first search request was not executed successfully, the first search request may be executed within an expanded first search window. The updated first cursor starting location may be revised based, at least in part, upon the expanded first search window. A new search request may be received for the memory system that satisfies the first search criteria. The new search request may be executed within a new first search window starting at the updated first cursor starting location. The first cursor pointer may be updated to identify a new first cursor starting location based, at least in part, upon the new first search window. A second cursor pointer may be maintained for the memory system, wherein the second cursor pointer may concern a second search criteria and may identifies an initial second cursor starting location. A second search request may be received for the memory system that satisfies the second search criteria. The second search request may be executed within an initial second search window starting at the initial second cursor starting location. The second cursor pointer may be updated to identify an updated second cursor starting location based, at least in part, upon the initial second search window. The memory system may be a portion of a storage platform.

In another implementation, a computing system includes a processor and memory is configured to perform operations including: maintaining a first cursor pointer for a memory system, wherein the first cursor pointer concerns a first search criteria and identifies an initial first cursor starting location; receiving a first search request for the memory system that satisfies the first search criteria; executing the first search request within an initial first search window starting at the initial first cursor starting location; and updating the first cursor pointer to identify an updated first cursor starting location based, at least in part, upon the initial first search window.

One or more of the following features may be included. If the first search request was executed successfully, the first search request may be satisfied. If the first search request was not executed successfully, the first search request may be executed within an expanded first search window. The updated first cursor starting location may be revised based, at least in part, upon the expanded first search window. A new search request may be received for the memory system that satisfies the first search criteria. The new search request may be executed within a new first search window starting at the updated first cursor starting location. The first cursor pointer may be updated to identify a new first cursor starting location based, at least in part, upon the new first search window. A second cursor pointer may be maintained for the memory system, wherein the second cursor pointer may concern a second search criteria and may identifies an initial second cursor starting location. A second search request may be received for the memory system that satisfies the second search criteria. The second search request may be executed within an initial second search window starting at the initial second cursor starting location. The second cursor pointer may be updated to identify an updated second cursor starting location based, at least in part, upon the initial second search window. The memory system may be a portion of a storage platform.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
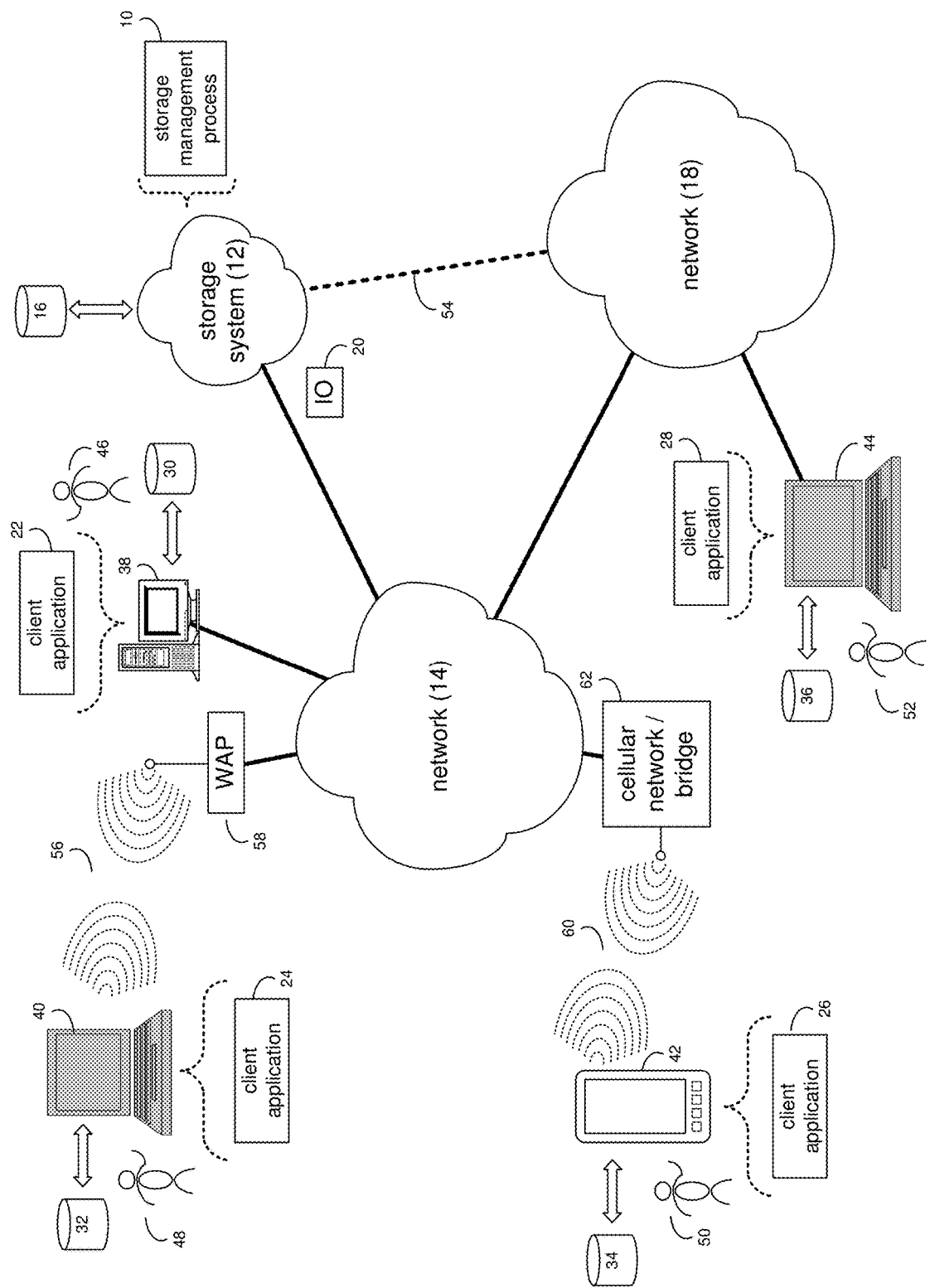
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18), For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

The Data Storage System

Figure 2:
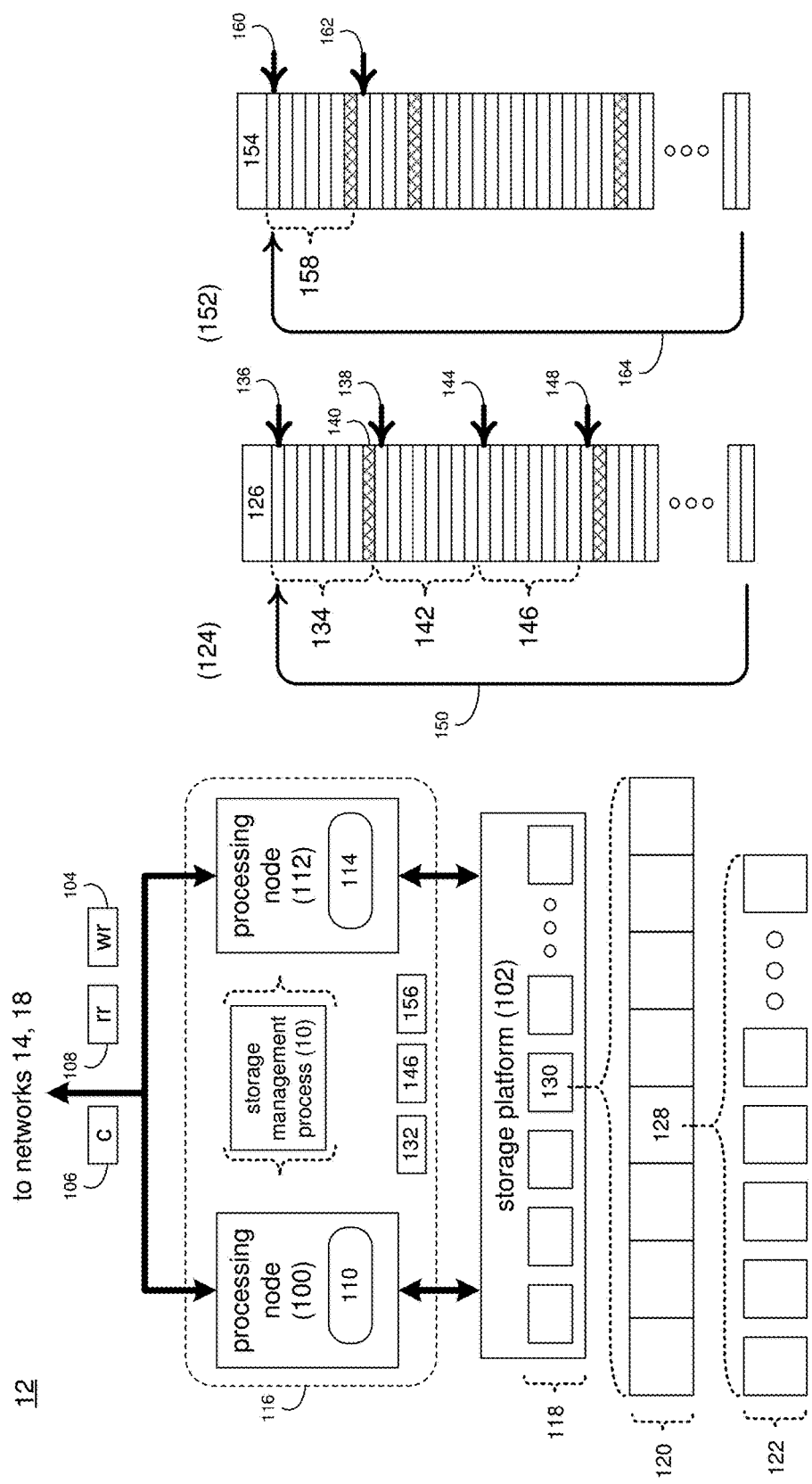
FIG. 2 is a diagrammatic view of the storage system of FIG. 1.

Referring also to FIG. 2, there is shown a general implementation of storage system 12. In this general implementation, storage system 12 may include processing node 100. Processing node 100 may be configured to perform computational tasks and may be configured to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112). Processing node 112 may be configured to perform computational tasks and may be configured to store data within storage platform 102.

Processing node 112 may include cache memory system 114. Examples of cache memory system 114 may include but are not limited to a volatile, solid-state, cache memory system (e.g., a static RAM cache memory system) and/or a non-volatile, solid-state, cache memory system (e.g., a flash-based, cache memory system). Processing node 112 may initially store content 106 within cache memory system 114. Depending upon the manner in which cache memory system 114 is configured, processing node 112 may immediately write content 106 to storage platform 102 (if cache memory system 114 is configured as a write-through cache) or may subsequently write content 106 to storage platform 102 (if cache memory system 114 is configured as a write-back cache).

Processing nodes 100, 112 may be configured to a form a computing cluster (e.g., computing cluster 116), wherein an example of computing cluster 116 may include but is not limited to an active-active computing cluster. As in known in the art, two servers may be configured as companion servers, each with independent workloads. These companion servers may run on the primary and secondary nodes of a storage system, as individual servers until one fails. When a failure occurs, the secondary companion may take over the devices, client connections, and so on from the primary companion, wherein the secondary companion may service the failed-over clients (as well as any new clients) until the primary companion is restored (e.g., failsback) and resumes its activities. Fallback may be a planned event during which the primary companion takes back its devices and client connections from the secondary companion to resume its services. During failover, clients may connect to the secondary companion to resubmit their uncommitted transactions. During failback, clients may connect to the primary companion to resubmit their transactions. Clients with the failover property may reestablish their connections automatically.

Storage Management Process

As discussed above and depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache). Accordingly and in order to satisfy such movement of content from cache memory system 110 to storage platform 102, storage space needs to available within storage platform 102. Accordingly, storage management process 10 may be configured to perform maintenance procedures and operations on storage platform 102 to ensure the availability of such storage space.

As discussed above, storage platform 102 may include a plurality of storage devices (e.g., hard disk drives and/or solid state storage devices) that may be configured to provide various levels of performance and/or high availability via standard RAID structures (e.g., RAID 0, RAID 1, RAID 3, RAID 5, RAID 6, RAID 7 or RAID 10).

For this example, assume that storage platform 102 includes plurality of large storage portions 118 (e.g., a plurality of 64 gigabyte storage portions), which may be referred to as ubers. Each of plurality of large storage portions 118 may include a plurality of large storage sub-portions 120 (e.g., eight 8 gigabyte storage portions), which may be referred to as sub-ubers. Each of plurality of large storage sub-portions 120 may include a plurality of physical large blocks (PLBs) 122 (e.g., 4,096 2 megabyte PLBs).

As discussed above, storage management process 10 may be configured to perform maintenance procedures and operations on storage platform 102 to ensure the availability of storage space within storage platform 102. For example, storage management process 10 may be configured to obtain empty PLBs that may be used when moving content from cache memory system 110 to storage platform 102. Additionally, storage management process 10 may be configured to execute a combining operation, wherein two or more partially-filled PLBs may be combined to free up one or more unused PLBs. For example, two PLBs having an average utilization of <50% may be combined so that one PLB is unused (and now available for use when moving content from cache memory system 110 to storage platform 102). Further, storage management process 10 may be configured to execute a compact & append operation, wherein the data within a PLB may be compressed and organized to define a block of unused space within that PLB that may be used to store new content.

In order to enable storage management process 10 to more efficiently manage e.g., the various storage devices/portions/sub-portions/PLBs within storage platform 102, storage management process 10 may utilize one or more cursor pointers (such as cursor pointer 124), as will be explained below.

Figure 3:
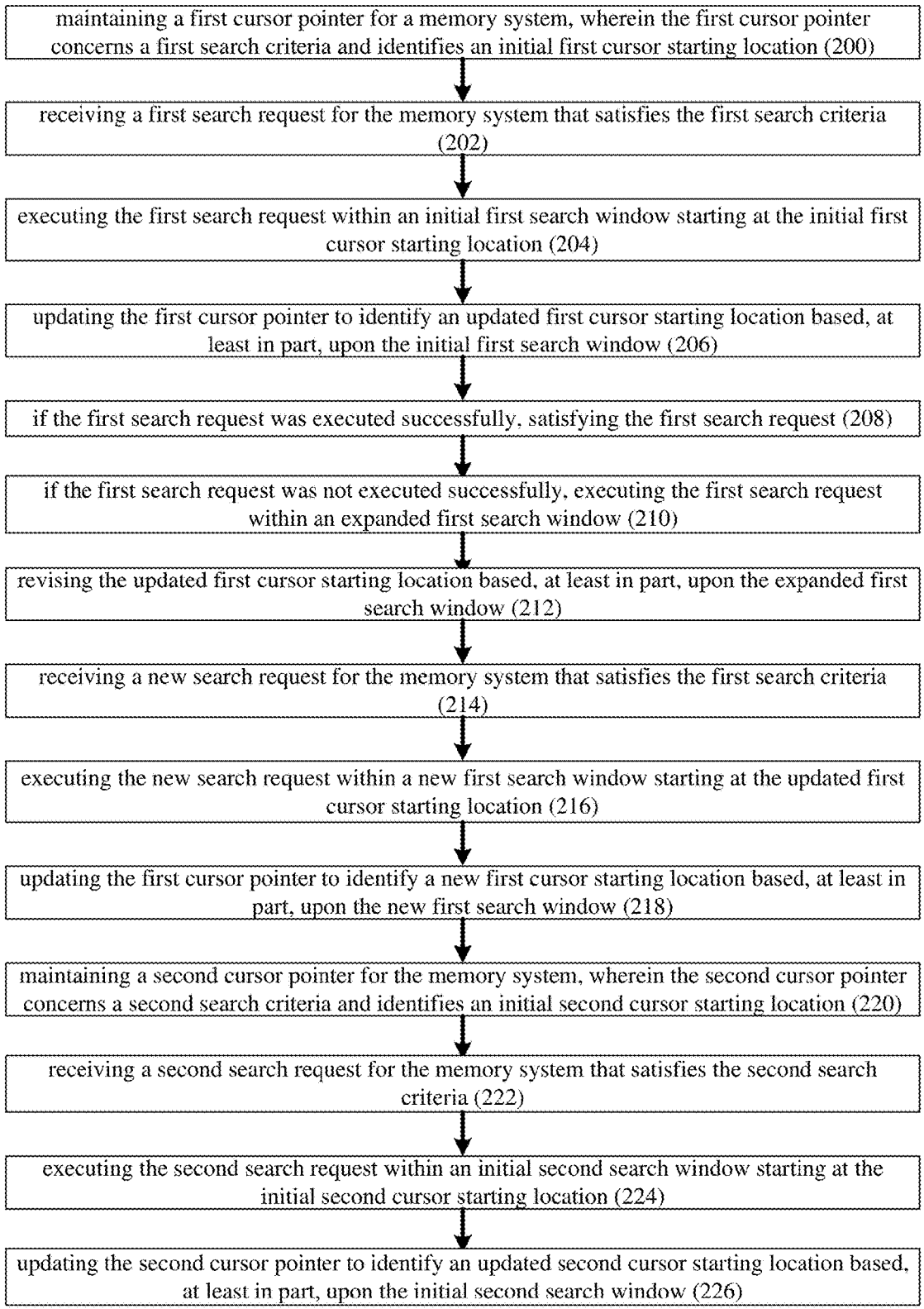
FIG. 3 is a flow chart of the storage management process of FIG. 1.

Referring also to FIG. 3, storage management process 10 may maintain 200 a first cursor pointer (e.g., cursor pointer 124) for a memory system (e.g., some or all of storage platform 102), wherein the first cursor pointer (e.g., cursor pointer 124) may concern a first search criteria (e.g., first search criteria 126) and may identify an initial first cursor starting location.

For the following example, assume that first search criteria 126 for cursor pointer 124 is to search for and locate unused (i.e., empty) physical large blocks (PLBs) within storage platform 102. While the following discussion concerns this searching operation being executed on large storage sub-portion 128 (e.g., chosen from plurality of large storage sub-portions 120), this is for illustrative purposes only and is not intended to be a limitation of this disclosure, as other configurations are possible and are considered to be within the scope of this disclosure. For example, the granularity of this searching operation may be varied depending upon e.g., design criteria, the size of storage platform 102, the processing capabilities of storage platform 102, and the parallelism of storage platform 102. Accordingly, it is understood that this searching operation may be executed on: a specific large storage sub-portion (e.g., large storage sub-portion 128) chosen from plurality of large storage sub-portions 120. a specific large storage portion (e.g., large storage portion 130) chosen from plurality of large storage portions 118, or the entirety of storage platform 102.

Concerning the initial first cursor starting location, this is the location within e.g., large storage sub-portion 128 where any new searches are to begin (as will be discussed below in greater detail)

Storage management process 10 may receive 202 a first search request (e.g., first search request 132) for the memory system (e.g., large storage sub-portion 128) that satisfies the first search criteria (e.g., first search criteria 126). For example, assume that content currently included within cache memory system 110 has grown "cold" and needs to be "destaged" (i.e., moved from cache memory system 110 to storage platform 102). Accordingly and in order to effectuate such destaging, one or more empty physical large blocks (PLBs) may be needed. Accordingly and for this example, assume that first request 132 is a request for an empty physical large block within (in this example) large storage sub-portion 128.

Storage management process 10 may execute 204 the first search request (e.g., first search request 132) within an initial first search window (e.g., initial first search window 134) starting at initial first cursor starting location 136. For this example, assume that large storage sub-portion 128 was never searched before concerning the first search criteria (e.g., first search criteria 126). Therefore, initial first cursor starting location 136 may point to the first PLB within large storage sub-portion 128. Initial first search window 134 may be set to an initial length that defines the number of PLBs to be searched before reporting that an empty PLB could not be found. For ease of illustration, these search windows (including initial first search window 134) are shown as being equal length (e.g., eight PLBs). However, it is understood that these search windows may vary in size.

When executing 204 first search request 132, storage management process 10 may sequentially examine each of the PLBs included within large storage sub-portion 128 and defined within initial first search window 134 in an attempt to locate (in this example) an empty PLB. Once initial first search window 134 is searched, storage management process 10 may update 206 the first cursor pointer (e.g., cursor pointer 124) to identify an updated first cursor starting location (e.g., updated first cursor starting location 138) based, at least in part, upon initial first search window 134. Specifically, being that all of the PLBs within first search window 134 were already searched, any subsequent searches for empty PLBs within large storage sub-portion 128 should start at updated first cursor starting location 138.

If the first search request (e.g., first search request 132) was executed successfully (e.g., an empty PLB was found within first search window 134), storage management process 10 may satisfy 208 the first search request (e.g., first search request 132). For example, if storage management process 10 finds that PLB 140 is empty, first search request 132 may be satisfied 208 and PLR 140 may be assigned to (and utilized for) the destaging operation upon which first search request 132 is based.

If the first search request (e.g., first search request 132) was not executed successfully (e.g., an empty PLB was not found within first search window 134), storage management process 10 may execute 210 the first search request (e.g., first search request 132) within an expanded first search window. For example, if storage management process 10 did not find any empty PLBs within first search window 134, an expanded first search window may be defined. Accordingly, first search window 134 may be expanded so that e.g., an additional eight PLBs may be searched to form expanded search window (i.e., the sum of first search window 134 and search window 142).

Storage management process 10 may then revise 212 the updated first cursor starting location (e.g., updated first cursor starting location 138) based, at least in part, upon the expanded first search window (i.e., the sum of first search window 134 and search window 142), resulting in updated first cursor starting location 144.

New Search/Old Criteria

Assume that storage management process 10 receives 214 a new search request (e.g., new search request 146) for the memory system (e.g., large storage sub-portion 128) that satisfies the first search criteria (e.g., first search criteria 126). Again, assume that first search criteria 126 for cursor pointer 124 is to search for and locate unused (i.e., empty) physical large blocks (PLBs) within storage platform 102 for a destaging operation.

Storage management process 10 may execute 216 the new search request (e.g., new search request 146) within a new first search window (e.g., new first search window 146) starting at the updated first cursor starting location (e.g., updated first cursor starting location 144). Storage management process 10 may then update 218 the first cursor pointer (e.g., cursor pointer 124) to identify a new first cursor starting location (e.g., new first cursor starting location 148) based, at least in part, upon the new first search window (e.g., new first search window 146).

Future search requests for the memory system (e.g., large storage sub-portion 128) that satisfy the first search criteria (e.g., first search criteria 126) may be repeated in the above-described fashion until the last PLB in large storage sub-portion 128 is examined. At that point, the examination of PLBs within large storage sub-portion 128 may be restarted from the first PLB within large storage sub-portion 128 (as illustrated with restart arrow 150).

New Search/New Criteria

While the above discussion concerned multiple search requests (e.g., search requests 132, 146) being received that satisfies the same search criteria (e.g., first search criteria 126), this is for illustrative purposes only and is not intended to be a limitation of this disclosure, as other configurations are possible and are considered to be within the scope of this disclosure. For example, storage management process 10 may maintain 220 a second cursor pointer (e.g., cursor pointer 152) for the memory system (e.g., large storage sub-portion 128), wherein the second cursor pointer (e.g., cursor pointer 152) concerns a second search criteria (e.g., second search criteria 154) and identifies an initial second cursor starting location. For the following example, assume that second search criteria 154 for cursor pointer 152 is to search for and locate moderately utilized (e.g., 30% to 70% utilized) physical large blocks (PLBs) within large storage sub-portion 128. Concerning the initial second cursor starting location, this is the location within e.g., large storage sub-portion 128 where any new searches are to begin.

Storage management process 10 may receive 222 a second search request (e.g., second search request 156) for the memory system (e.g., large storage sub-portion 128) that satisfies the second search criteria (e.g., second search criteria 154). For example, assume that storage management process 10 wants to combine partially-filled PLBs to form highly-utilized PLBs and unused PLBs. Accordingly and for this example, assume that second request 156 is a request for moderately utilized (e.g., 30% to 70% utilized) physical large blocks (PLBs) within (in this example) large storage sub-portion 128

Storage management process 10 may execute 224 the second search request (e.g., second search request 156) within an initial second search window (e.g., initial second search window 158) starting at initial second cursor starting location 160. For this example, assume that large storage sub-portion 128 was never searched before concerning the second search criteria (e.g., second search criteria 154). Therefore, initial second cursor starting location 160 may point to the first PLB within large storage sub-portion 128.

Storage management process 10 may update 226 the second cursor pointer to identify an updated second cursor starting location based, at least in part, upon the initial second search window (e.g., initial second search window 158).

When executing 224 second search request 156, storage management process 10 may sequentially examine each of the PLBs included within large storage sub-portion 128 and defined initial second search window 158 in an attempt to locate (in this example) 30% to 70% utilized PLBs. Once initial second search window 158 is searched, storage management process 10 may update 226 the second cursor pointer (e.g., cursor pointer 152) to identify an updated second cursor starting location (e.g., updated second cursor starting location 162) based, at least in part, upon initial second search window 158. Specifically, being that all of the PLBs within second search window 158 were already searched, any subsequent searches for 30% to 70% utilized PLBs within large storage sub-portion 128 should start at updated second cursor starting location 162.

Future search requests for the memory system (e.g., large storage sub-portion 128) that satisfy the second search criteria (e.g., second search criteria 154) may be repeated in the above-described fashion until the last PLB in large storage sub-portion 128 is examined. At that point, the examination of PLBs within large storage sub-portion 128 may be restarted from the first PLB within large storage sub-portion 128 (as illustrated with restart arrow 164).

General

As will be appreciated by one skilled in the art, the present disclosure may be embodied as a method, a system, or a computer program product. Accordingly, the present disclosure a take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

maintaining a first cursor pointer for a memory system, wherein the first cursor pointer concerns a first search criteria and identifies an initial first cursor starting location, wherein the first search criteria includes searching for one or more blocks within the memory system, wherein the one or more blocks include a predefined amount of bytes;

receiving a first search request for the memory system that satisfies the first search criteria;

executing the first search request within an initial first search window starting at the initial first cursor starting location, wherein executing the first search request within the initial first search window starting at the initial first cursor starting location includes locating at least one unused block from the one or more blocks;

updating the first cursor pointer to identify an updated first cursor starting location based, at least in part, upon the initial first search window; and in response to the first search request locating only used blocks, executing the first search request within an expanded first search window, wherein the expanded first search window includes a sum of the first search window and a search window of one or more blocks added sequentially from the first search window.

2. The computer-implemented method of claim 1 further comprising:

in response to the first search request locating the at least one unused block, satisfying the first search request.

3. The computer-implemented method of claim 1 further comprising:

revising the updated first cursor starting location based, at least in part, upon the expanded first search window.

4. The computer-implemented method of claim 1 further comprising:

receiving a new search request for the memory system that satisfies the first search criteria;

executing the new search request within a new first search window starting at the updated first cursor starting location; and updating the first cursor pointer to identify a new first cursor starting location based, at least in part, upon the new first search window.

5. The computer-implemented method of claim 1 further comprising:

maintaining a second cursor pointer for the memory system, wherein the second cursor pointer concerns a second search criteria and identifies an initial second cursor starting location, wherein the second search criteria includes searching for one or more blocks with a defined storage utilization;

receiving a second search request for the memory system that satisfies the second search criteria;

executing the second search request within an initial second search window starting at the initial second cursor starting location;

updating the second cursor pointer to identify an updated second cursor starting location based, at least in part, upon the initial second search window; and in response to the second search request locating two or more blocks that satisfied the second search criteria, combining the two or more blocks to generate at least one additional unused block from the one or more blocks.

6. The computer-implemented method of claim 1 wherein the memory system is a portion of a storage platform.

7. A computer program product residing on a non-transitory computer readable medium having a plurality of instructions stored thereon which, when executed by a processor, cause the processor to perform operations comprising:

maintaining a first cursor pointer for a memory system, wherein the first cursor pointer concerns a first search criteria and identifies an initial first cursor starting location, wherein the first search criteria includes searching for one or more blocks within the memory system, wherein the one or more blocks include a predefined amount of bytes;

receiving a first search request for the memory system that satisfies the first search criteria;

executing the first search request within an initial first search window starting at the initial first cursor starting location, wherein executing the first search request within the initial first search window starting at the initial first cursor starting location includes locating at least one unused block from the one or more blocks;

updating the first cursor pointer to identify an updated first cursor starting location based, at least in part, upon the initial first search window; and in response to the first search request locating only used blocks, executing the first search request within an expanded first search window, wherein the expanded first search window includes a sum of the first search window and a search window of one or more blocks added sequentially from the first search window.

8. The computer program product of claim 7 further comprising:

in response to the first search request locating the at least one unused blocks, satisfying the first search request.

9. The computer program product of claim 7 further comprising:

revising the updated first cursor starting location based, at least in part, upon the expanded first search window.

10. The computer program product of claim 7 further comprising:

receiving a new search request for the memory system that satisfies the first search criteria;

executing the new search request within a new first search window starting at the updated first cursor starting location; and updating the first cursor pointer to identify a new first cursor starting location based, at least in part, upon the new first search window.

11. The computer program product of claim 7 further comprising:

maintaining a second cursor pointer for the memory system, wherein the second cursor pointer concerns a second search criteria and identifies an initial second cursor starting location, wherein the second search criteria includes searching for one or more blocks with a defined storage utilization;

receiving a second search request for the memory system that satisfies the second search criteria;

executing the second search request within an initial second search window starting at the initial second cursor starting location;

updating the second cursor pointer to identify an updated second cursor starting location based, at least in part, upon the initial second search window; and in response to the second search request locating two or more blocks that satisfied the second search criteria, combining the two or more blocks to generate at least one additional unused block from the one or more blocks.

12. The computer program product of claim 7 wherein the memory system is a portion of a storage platform.

13. A computing system including a processor and memory configured to perform operations comprising:

maintaining a first cursor pointer for a memory system, wherein the first cursor pointer concerns a first search criteria and identifies an initial first cursor starting location, wherein the first search criteria includes searching for one or more blocks within the memory system, wherein the one or more blocks include a predefined amount of bytes;

receiving a first search request for the memory system that satisfies the first search criteria;

executing the first search request within an initial first search window starting at the initial first cursor starting location, wherein executing the first search request within the initial first search window starting at the initial first cursor starting location includes locating at least one unused block from the one or more blocks;

updating the first cursor pointer to identify an updated first cursor starting location based, at least in part, upon the initial first search window; and in response to the first search request locating only used blocks, if the first search request was not executed successfully, executing the first search request within an expanded first search window, wherein the expanded first search window includes a sum of the first search window and a search window of one or more blocks added sequentially from the first search window.

14. The computing system of claim 13 further comprising:
in response to the first search request locating the at least one unused blocks, satisfying the first search request.

15. The computing system of claim 13 further comprising:
revising the updated first cursor starting location based, at least in part, upon the expanded first search window.

16. The computing system of claim 13 further comprising:
receiving a new search request for the memory system that satisfies the first search criteria;

executing the new search request within a new first search window starting at the updated first cursor starting location; and updating the first cursor pointer to identify a new first cursor starting location based, at least in part, upon the new first search window.

17. The computing system of claim 13 further comprising:
maintaining a second cursor pointer for the memory system, wherein the second cursor pointer concerns a second search criteria and identifies an initial second cursor starting location, wherein the second search criteria includes searching for one or more blocks with a defined storage utilization;

receiving a second search request for the memory system that satisfies the second search criteria;

executing the second search request within an initial second search window starting at the initial second cursor starting location;

updating the second cursor pointer to identify an updated second cursor starting location based, at least in part, upon the initial second search window; and in response to the second search request locating two or more blocks that satisfied the second search criteria, combining the two or more blocks to generate at least one additional unused block from the one or more blocks.

18. The computing system of claim 13 wherein the memory system is a portion of a storage platform.

* * * * *